Oct. 14, 1941.  D. D. STORY ET AL  2,259,007
CONSTRUCTION OF STORAGE COMPARTMENTS
Filed Nov. 12, 1938  3 Sheets-Sheet 1

INVENTOR
DANIEL D. STORY
CHARLES CURTIS SCHLESSER
EDWARD E. SCHLESSER

ATTORNEY

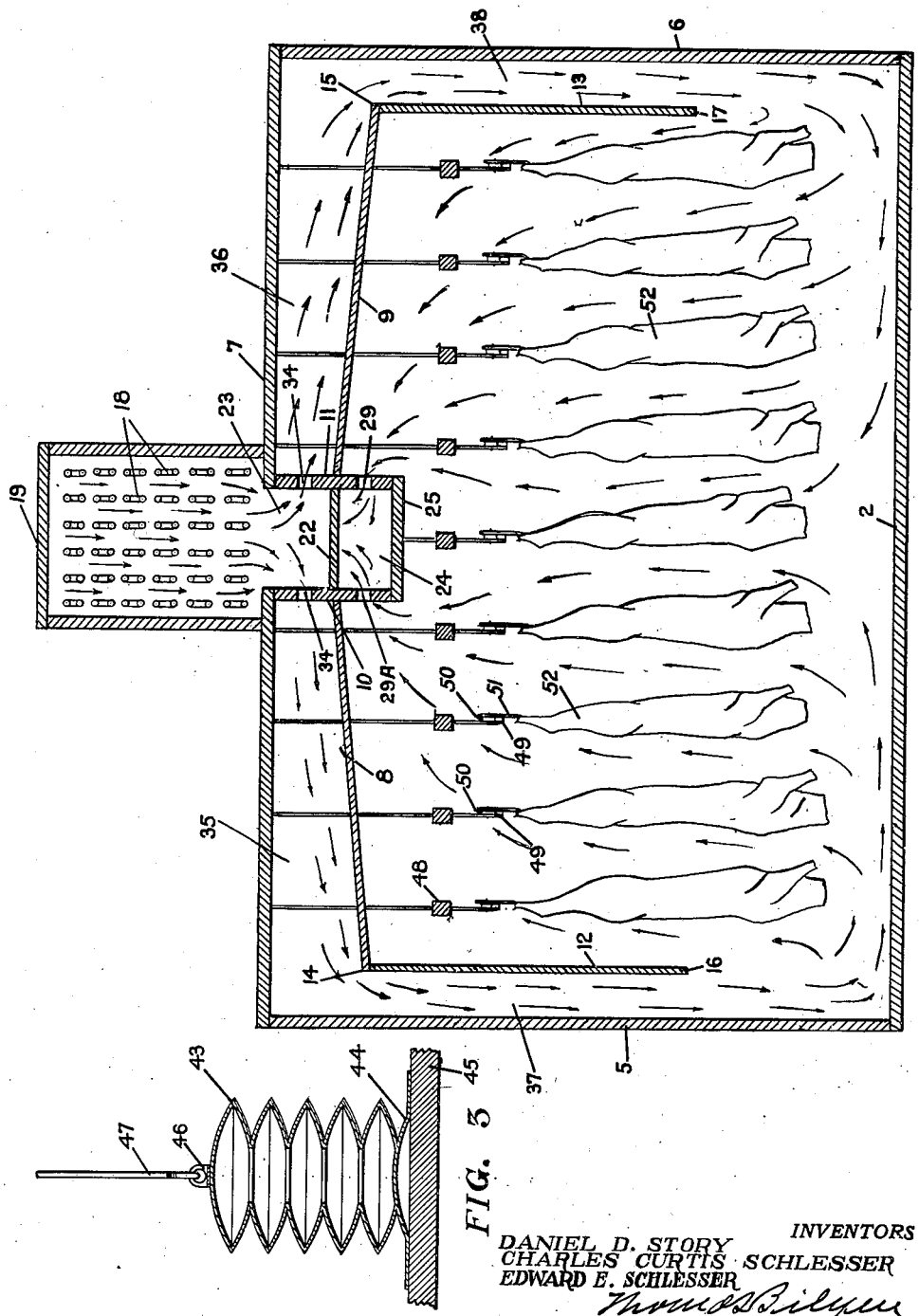

Oct. 14, 1941.   D. D. STORY ET AL   2,259,007
CONSTRUCTION OF STORAGE COMPARTMENTS
Filed Nov. 12, 1938   3 Sheets-Sheet 3

INVENTOR
DANIEL D. STORY
CHARLES CURTIS SCHLESSER
EDWARD E. SCHLESSER
ATTORNEY

Patented Oct. 14, 1941

2,259,007

UNITED STATES PATENT OFFICE 2,259,007

CONSTRUCTION OF STORAGE COMPARTMENTS

Daniel D. Story, Charles Curtis Schlesser, and Edward E. Schlesser, Portland, Oreg.

Application November 12, 1938, Serial No. 240,028

5 Claims. (Cl. 62—102)

Our invention relates to improvements in cooling compartments primarily for use in meat packing plants.

The invention is comprised primarily of a curing room having means for suspending and conveying meat carcasses therein and having superposed thereabove a refrigerated chamber through which air is circulated by mechanical means. The air flows from the refrigerated chamber through a partitioned tunnel and from there is delivered into the room in which the meat is disposed for curing. The partitioned tunnel runs longitudinally of the room and spaced ports are disposed both above and below the partition in order that the chilled air to be circulated within the meat chamber may be uniformly distributed. A hood and a skirt are disposed within the chamber to predetermine the path of the flow of air to be circulated.

The primary purpose and object of our invention is to provide a meat curing chamber in which a uniform temperature and a uniform humidity may be maintained during the curing process.

A still further object of our invention is to provide a curing chamber for freshly butchered meat that will permit a quick liberation of the body temperature and also one in which meat may be stored for longer periods of time without meat losses or without meat deterioration.

A still further object of our invention is to provide a curing chamber in which the sweating of the walls and particularly the ceiling of the chamber will be eliminated.

And a still further object of our invention consists in providing automatic means as well as manual means for the regulating of the amount of air and the volume of air that is to be circulated through the curing chamber.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 2 is a sectional end view of the mechanism illustrated in Fig. 1.

Fig. 3 is a sectional side view of an automatic temperature controlled actuator for the door through which the air is to be circulated.

Like reference characters refer to like parts throughout the several views.

Figure 1:
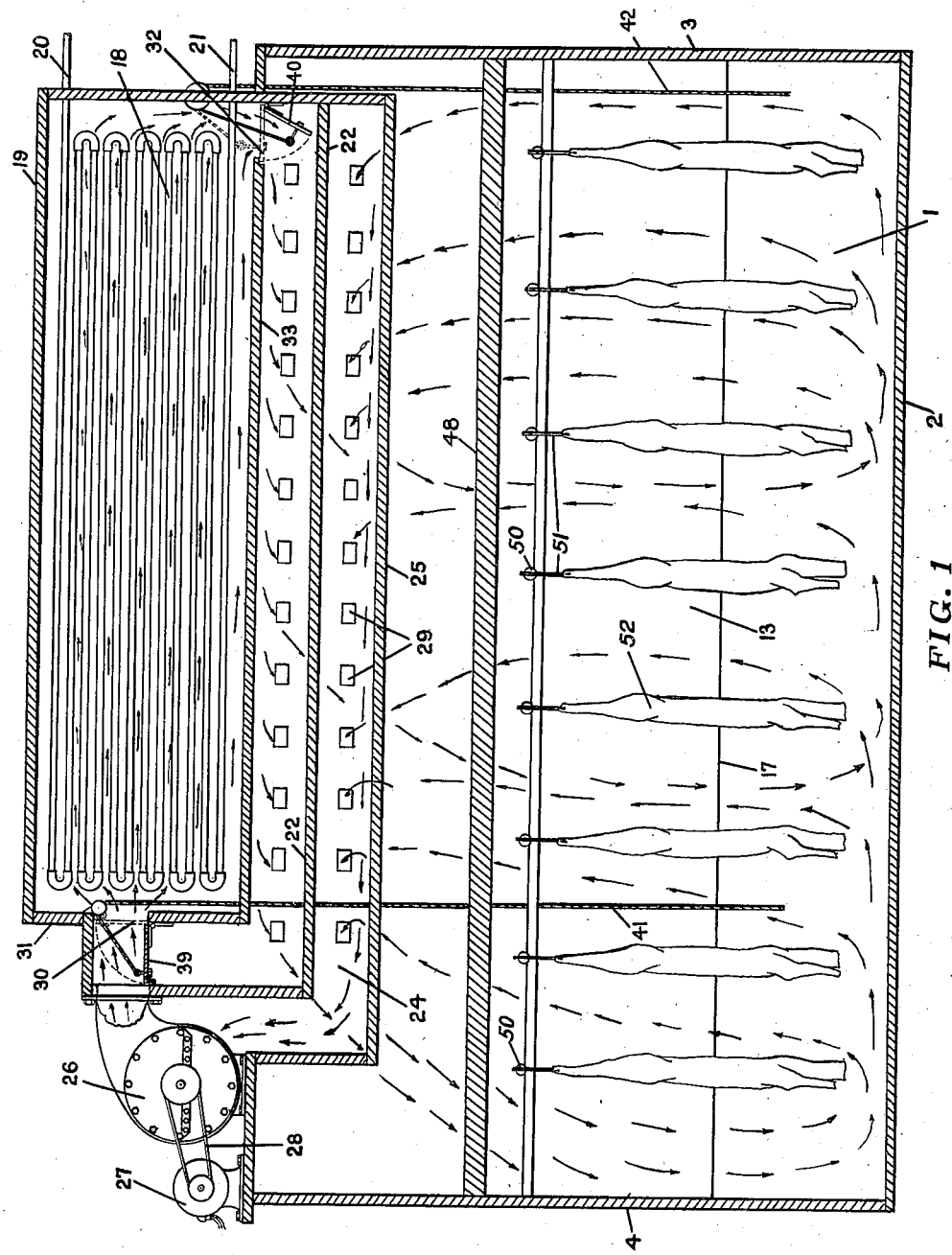
Fig. 1 is a sectional side view of the chamber, the tunnel, and the refrigerated compartment.
Figure 4:
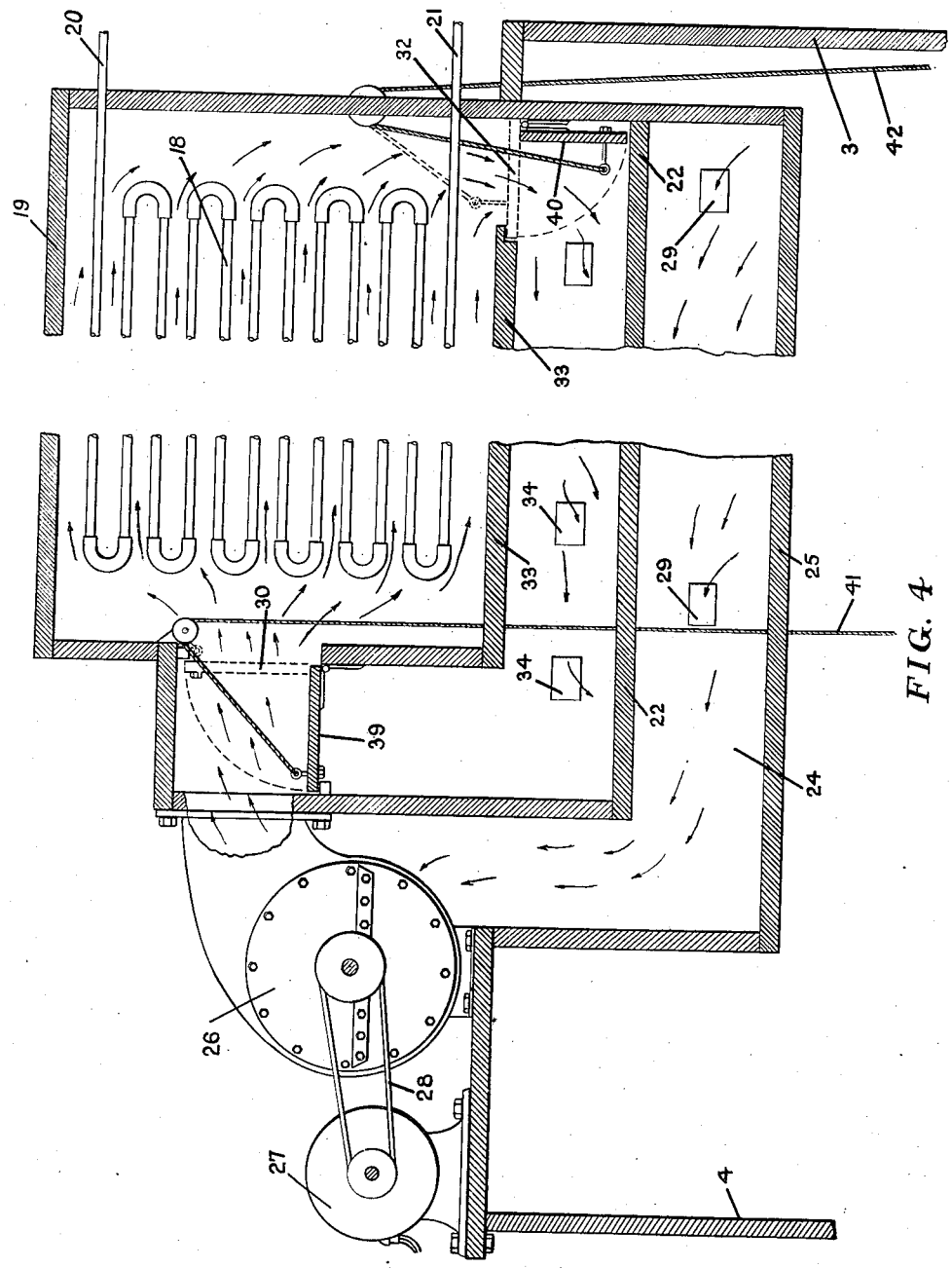
Fig. 4 is a fragmentary sectional side view of the compartmented tunnel and of the chamber in which the refrigerating coils are disposed. This view is made to illustrate the staggered relationship of the ports through which air flows from the partitioned tunnel.

We provide our curing chamber 1 with a bottom 2, walls 3 and 4 and side walls 5 and 6 and a primary top 7. The chamber has a hood disposed therein that slopes downwardly from the juncture of the sides 8 and 9 of the hood with the side walls 10 and 11 of the air tunnel.

The tops 8 and 9 of the hood run the full length of the curing chamber and contact the end walls 3 and 4 of the chamber. Skirts 12 and 13 depend from the outer edges 14 and 15 of the hood and the skirts 12 and 13 also run the full length of the curing chamber.

The bottoms 16 and 17 of the respective skirts terminate above the bottom 2 of the curing chamber. Refrigerated coils 18 are disposed within a suitable coil box 19 that is superposed over the curing chamber 1 and refrigerant for the coils runs through a pipe 20 that leads to a source of cooling medium, and the refrigerant flows through the pipe 20 and the coils 18 and back to the source of supply of the refrigerant back to the return pipe 21.

The air tunnel running longitudinally of the refrigerated chamber is partitioned longitudinally as illustrated at 22 to divide the air tunnel into an upper compartment 23 and a lower compartment 24 and a bottom 25 is disposed for closing the lower tunnel 24.

Air for regulating the temperature of the cooling chamber is circulated by a power driven fan 26. The fan 26 is driven by a prime mover 27 by any suitable driving mechanism as through the use of a belt 28. The air is drawn by the fan through the lower compartment 24 of the tunnel through suitable ports 29 that are disposed within the respective side walls 10 and 11 of the partitioned air tunnel and the air is forced by the fan through the outlet port 30 disposed in the end wall 31 of the coil box directly over the coils, and the air flows longitudinally of the coil box and over the coils and is delivered therefrom through a port 32 disposed in the bottom 33 of the coil box.

The air flows from the port 32 directly into the upper air tunnel 23 and flows outward therefrom through the ports 34 disposed within the side walls 10 and 11. The cooled air then flows outwardly and downwardly through the spaces 35 and 36 that are disposed between the hoods 8 and 9 and the top 7 of the curing chamber and then downwardly through the spaces 37 and 38 disposed between the skirts 12 and 13 and the side walls 5 and 6. Thus the cooled air is forced downwardly into the bottom of the curing room and then flows upwardly through its thermal action aided by the suction fan, and flows into the lower air tunnel 24 through the ports 29 and 29A disposed within the side walls 10 and 11 of the lower compartment.

Spring actuated doors 39 and 40 are associated with the respective ports 32 and 30. These doors are intended for predetermining the volume of air that is to be circulated through the curing room. These doors may be actuated by pull cords 41 and 42 or they may be thermostatically and automatically actuated by a plurality of thermostat wafers 43. The bottom member of the thermostat wafer has a flanged connection 44 for securing the same to any suitable fixed support 45 and the upper one of the wafers has a boss 46 provided thereupon to which the pull cord 47 is attached. This provides thermostatic means for actuating the doors to thereby predetermine the volume of air that is to be circulated through the coil box and through the circulating room.

A plurality of beams 48 run longitudinally of the room and a track 49 is suspended from the beams and a trolley 50 rides upon the track and a hook 51 is provided to which the carcass or partial meat carcass 52 is attached and from which the same is suspended within the curing room. This provides means for suspending the carcass or partial carcass and for conveying the same within the room and from the room while suspended.

While we have here shown our device as being disposed within one room only, it is customary in meat packing plants to have a plurality of adjacent rooms and to transfer meat from one of the rooms to the other while in a suspended condition. We do not wish to be limited to a single room for our device may be adapted in which a plurality of adjacent rooms are provided, each of which may be cooled from a coil box associated with the room or from a common coil box not here shown that may be provided at the top and adjacent a number of rooms each being cooled or chilled from a common cooling or coil box.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What we claim is:

1. A curing chamber for fresh meat, said chamber being normally closed, means for supporting meat in a suspended condition and for conveying the suspended meat within the chamber, a coil box disposed on top of the chamber and running longitudinally of the top of the chamber, a refrigerated coil of pipe running longitudinally of the coil box, an air tunnel disposed beneath the coil box, a partition running longitudinally of the tunnel and dividing the tunnel into upper and lower passageways, a hood disposed within the curing chamber having skirts downwardly depending from the hood and at opposite edges of the hood, and the hood and the skirts being spaced from the walls, roof and the floor of the curing chamber, power means for circulating air from the curing chamber through the lower passageway of the air tunnel into the coil box and for recirculating the air into the curing chamber and means for predetermining the volume of air that is to be circulated.

2. A curing room for fresh meats, comprising a self contained curing room, means for suspending meat within the curing room and for conveying the meat while suspended, means for circulating air through the curing room and for delivering the same at the sides of the curing room and near the bottom of the curing room, means for cooling the air, means for taking the air from the curing room between its sides and near the ceiling, means for predetermining the volume of the air that is to be circulated, and means for uniformly cooling all of the air that is to be recirculated back into the curing room.

3. A curing room for fresh meats, comprising a room, means for suspending meat within the room and for conveying the suspended meat, an air circulator, said air circulator being adapted for delivering air into the room near the floor of the room and at the sides of the room, a hood having skirts associated therewith and so positioned in the room to predetermine the path of flow the air will travel within the curing room, means for delivering air from the room near the ceiling of the room and between the sides of the room, means for chilling the air that is to be circulated exteriorly of the room and settable means for predetermining the volume of the air that is to be circulated through the curing room.

4. A curing room for fresh meat comprising a room, power means for circulating air through the room and for delivering air near the floor of the room and at a plurality of points, means for delivering the circulating air from the room near the ceiling of the room and through a plurality of ports, means for cooling the air being circulated exteriorly of the curing room, a hood having skirts associated therewith disposed in the curing room and so positioned as to predetermine the travel of the cooled air being recirculated, and automatic thermostatic means for predetermining the volume of air that is to be circulated through the curing room.

5. A curing room for fresh meats comprising a room, a hood having depending skirts disposed longitudinally of the room, with said hood and skirts contacting the end walls of the curing room, with the hood and skirts being in spaced relation with the ceiling of the room, the side walls of the room and the floor of the room, a tunnel having refrigerating coils disposed therein is superposed over the curing room and runs longitudinally of the room, a divided tunnel disposed within the curing room and placed below the tunnel having refrigerating coils disposed therein, ports disposed within the side walls of the divided tunnel to deliver cooled air within the curing room and above the hood and ports disposed within the side walls of the partitioned tunnel to admit air from the curing room into the tunnel and means for circulating air and for predetermining the volume of air that is to be recirculated.

DANIEL D. STORY.
CHARLES CURTIS SCHLESSER.
EDWARD E. SCHLESSER.